United States Patent
Funakura et al.

(10) Patent No.: US 6,826,001 B2
(45) Date of Patent: Nov. 30, 2004

(54) COLOR FILTER

(75) Inventors: Seiji Funakura, Narita (JP); Iemasa Yao, Kashima (JP); Arata Kudou, Kashima-gun (JP); Eiichi Kiuchi, Sawara (JP); Hiroshi Katsube, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/257,381

(22) PCT Filed: Feb. 25, 2002

(86) PCT No.: PCT/JP02/01664

§ 371 (c)(1),
(2), (4) Date: Oct. 18, 2002

(87) PCT Pub. No.: WO02/067022

PCT Pub. Date: Aug. 29, 2002

(65) Prior Publication Data

US 2003/0151708 A1 Aug. 14, 2003

(30) Foreign Application Priority Data

Feb. 23, 2001 (JP) .................................. 2001-047645
Sep. 11, 2001 (JP) .................................. 2001-274939

(51) Int. Cl.[7] ................................................. G02B 5/22
(52) U.S. Cl. ......................... 359/885; 430/7; 430/517; 349/106; 252/586
(58) Field of Search ............................ 359/885; 430/7, 430/517; 349/106; 252/586; 428/1.31

(56) References Cited

U.S. PATENT DOCUMENTS

| 4,077,974 A | | 3/1978 | Wessling |
| 5,380,842 A | * | 1/1995 | Itoh ........................... 540/128 |
| 5,968,688 A | | 10/1999 | Masuda et al. |

FOREIGN PATENT DOCUMENTS

| GB | 2 182 165 A | | 5/1987 |
| JP | 51-64534 | | 6/1976 |
| JP | 63-286801 | | 11/1988 |
| JP | 5-295283 | | 11/1993 |
| JP | 9-68607 | | 3/1997 |
| JP | 9-171108 | | 6/1997 |
| JP | 9-291240 | | 11/1997 |
| JP | 10-160928 | * | 6/1998 |
| JP | 11-302283 | | 11/1999 |
| JP | 2001-342374 | | 12/2001 |
| JP | 2002-131521 | * | 5/2002 |
| JP | 2002-131522 | * | 5/2002 |
| JP | 2002-162515 | | 6/2002 |
| JP | 2002-250812 | | 9/2002 |
| WO | WO 02/14912 A1 | | 2/2002 |

OTHER PUBLICATIONS

M. Abd El–Ghaffar et al., "Synthesis and characterization of some halogenated phthalocyanine pigments", Pigment & Resin Technology 26(2), pp. 77–80(1997).*

(List continued on next page.)

*Primary Examiner*—Leo Boutsikaris
(74) *Attorney, Agent, or Firm*—Armstrong, Kratz, Quintos, Hanson & Brooks, LLP

(57) ABSTRACT

The present invention provides a color filter which is more durable than a dye-type color filter and also has green pixel portions which exhibit a bright green color having a strong yellowish tinge when used in a liquid crystal display device using a three-band lamp having a main emission line of green light of about 545 nm as a light source, thus enabling the liquid crystal display device to display bright images even when using a backlighting light source having a low intensity. This color filter comprises green pixel portions which (1) contain a halogenated metal phthalocyanine dye wherein 8 to 16 halogen atoms are bonded to benzene rings in one phthalocyanine molecule, and (2) exhibit maximum transmittance at a wavelength within a range from 520 nm to 590 nm with respect to the transmission spectra of the entire range of visible light.

9 Claims, 3 Drawing Sheets

OTHER PUBLICATIONS

R.Decreau et al., "Synthesis and characterization of a series of hexadecachlorinated phthalocyanines", Inorganica Chimica Acta 293, pp. 80–87(1999).*

Frank H. Moser et al.; The Phthalocyanines; vol. II, Manufacture and Applications, CRC Press, Inc., Boca Raton, Florida.

Abd El–Ghaffar, et al; "Synthesis and characterization of some halogenated phthalocyanine pigments"; Pigment and Resin Technology; vol. 26, No. 2; 1997; pp. 77–80.

Decréau et al.; "Synthesis and characterization of a series of hexadecachlorinated phtlaocyanines"; Inorganica Chimica Acta; vol. 293; 1999; pp. 80–87.

* cited by examiner

COLOR FILTER

TECHNICAL FIELD

The present invention relates to a color filter comprising green pixel portions containing a halogenated metal phthalocyanine pigment.

BACKGROUND ART

In a liquid crystal display device, a color filter comprises a transparent substrate on which red pixel portions, green pixel portions, and blue pixel portions are formed, and halogenated copper phthalocyanine dyes or halogenated copper phthalocyanine pigments are generally used for the green pixel portions.

As a green colorant for the green pixel portions of the color filter, there is used a dye or pigment having a structure of a halogenated metal phthalocyanine wherein 8 or more halogen atoms are bonded to benzene rings in one phthalocyanine molecule. However, for dyes or pigments used in the field of color filters, which are different from those for general purposes such as lithographic inks, paints, and coloring of molded articles, there is required not only coloring characteristics, but also the following higher characteristics (1) and (2):

(1) high selectivity of the wavelength of light which penetrates, and
(2) very high transmittance of light having a specific wavelength.

Japanese Unexamined Patent Application, First Publication No. Sho 63-286801 discloses a technology which uses, as such a green dye colorant, a halogenated metal phthalocyanine sulfonate dye such as octachloro copper phthalocyanine sulfonate dye, octachloro nickel phthalocyanine sulfonate dye, or octachloro cobalt phthalocyanine sulfonate dye in combination with a yellow organic dye.

Also, Japanese Unexamined Patent Application, First Publication No. Hei 11-302283 discloses a technology which uses a phenylated metal phthalocyanine sulfonate dye such as octaphenyl copper phthalocyanine sulfonate dye, octaphenyl zinc phthalocyanine sulfonate dye, or octaphenyl aluminum phthalocyanine sulfonate dye in combination with a yellow organic dye.

Furthermore, Japanese Unexamined Patent Application, First Publication No. Hei 9-291240 discloses a technology which uses a green copper phthalocyanine dye having a sulfonic acid group and a monoazo dye residue, and a green zinc phthalocyanine dye having a sulfonic acid group and a monoazo dye residue.

However, these dyes have drawbacks in that they are inferior in the durability of various characteristics such as light resistance.

As a green pigment with fewer of the drawbacks described above, there is commonly used a halogenated copper phthalocyanine pigment wherein 8 or more of hydrogen atoms among 16 hydrogen atoms on 4 benzene rings in one phthalocyanine molecule are substituted with halogen atoms such as bromine and chlorine atoms. This halogenated copper phthalocyanine pigment is a mixture of halogenated copper phthalocyanine pigments wherein hydrogen atoms are substituted with bromine atoms and/or chlorine atoms in different ratios.

For the green pixel portions of the color filter, a brighter green pigment having a stronger yellowish tinge is required. It has conventionally been deemed to be preferable that the number of halogen atoms bonded to benzene rings in one halogenated copper phthalocyanine molecule be increased in order to develop a bright green color having a strong yellowish tinge. Also, it has been known that as the number of bromine atoms among halogen atoms bonded to one halogenated copper phthalocyanine molecule increases, a green color having a stronger yellowish tinge can be developed. For example, Japanese Unexamined Patent Application, First Publication No. Hei 9-68607 proposes a method of using, in green pixel portions of a color filter, a halogenated copper phthalocyanine pigment containing a high-bromine content halogenated copper phthalocyanine such as C.I. Pigment GREEN 36 wherein numerous hydrogen atoms among 16 hydrogen atoms on 4 benzene rings in one phthalocyanine molecule are substituted with bromine atoms.

Also Japanese Unexamined Patent Application, First Publication No. Hei 10-160928 proposes a method of adding a yellow pigment such as C.I. Pigment YELLOW 150 or C.I. Pigment YELLOW 185 to a green pigment such as C.I. Pigment GREEN 36, thereby imparting a stronger yellowish tinge, for the purpose of changing a color hue so as to increase the yellowishness of a green color.

However, as a backlighting light source of a liquid crystal display device, a three-band lamp having a main emission line of green light of about 545 nm is used, and the following problems arise when using the above-described conventional color filter in a liquid crystal display device using this light source.

Any color filter using the green dye described in the aforementioned Japanese Unexamined Patent Application, First Publication No. Sho 63-286801 has fundamental drawbacks such as poor light resistance and fading of color hue during use over long periods.

Also, green pixel portions of color filters produced by using C.I. Pigment GREEN 36 as the green pigment described in Japanese Unexamined Patent Application, First Publication No. Hei 9-68607 cannot achieve desired chromaticity and desired color hue, which are suitable for red pixel portions and blue pixel portions to be used in combination.

Furthermore, Japanese Unexamined Patent Application, First Publication No. Hei 10-160928 proposes to bring the chromaticity and color hue of pixel portions close to the desired chromaticity and desired color hue by adding a yellow pigment to C.I. Pigment GREEN 36. However, the amount of the yellow pigment to be added to the green pigment for the purpose of achieving this object is high, thus portions with neither desired chromaticity nor desired color hue in the pixel portions are sometimes formed for the following reason.

That is, the yellow and green pigments used in combination during the storage of a photocurable composition described hereinafter used to form pixel portions cause color separation.

Consequently, a color filter having such pixel portions has drawbacks in that the resulting liquid crystal display has insufficient brightness and a backlighting light source with a high intensity must be used to display satisfactory bright images, and that portions with neither desired chromaticity nor desired color hue is formed in the pixel portions.

DISCLOSURE OF INVENTION

An object to be achieved by the present invention is to provide a color filter which is more durable than a dye-type color filter and also has green pixel portions which can produce a bright green color having a stronger yellowish tinge when used in a liquid crystal display device using a three-band lamp having a main emission line of green light of about 545 nm as a light source, and thus enabling the liquid crystal display device to display bright images even when using a backlighting light source having a low intensity.

The present inventors have synthesized various halogenated metal phthalocyanine pigments having characteristics superior to those of a conventional halogenated copper phthalocyanine pigment used to form green pixel portions of a color filter and measured the respective transmission spectra, and then researched on the suitability as green pixel portions.

In the three-band lamp used in an actual liquid crystal display device, the emission wavelength is sometimes optimized in order to enable it to suit each color filter, and use of a three-band lamp in the evaluation of the present invention is a complicated operation. Therefore, in light of the fact that a main emission line of green light of the three-band lamp is about 545 nm, the evaluation was conducted by using a three-band fluorescent lamp F10 light source having a main emission line at 545 nm, which is a type of this three-band lamp, specified in Japanese Industrial Standard (JIS) Z8719, in place of the three-band lamp used in the actual liquid crystal display device. As a result, the present inventors have found that, when using, as a colorant for forming green pixel portions, a specific halogenated metal phthalocyanine pigment, which exhibits maximum transmittance at a wavelength within a range from 520 to 590 nm with respect to the transmission spectra, there can be provided a bright liquid crystal display device which exhibits a bright green color having a stronger yellowish tinge. Thus, the present invention has been completed.

The present invention provides a color filter comprising a transparent substance and red pixel portions, green pixel portions, and blue pixel portions formed on said transparent substrate, wherein said green pixel portions (1) contain a halogenated metal phthalocyanine pigment in which 8 to 16 halogen atoms are bonded to benzene rings in one phthalocyanine molecule, and (2) exhibit maximum transmittance at a wavelength within a range from 520 nm to 590 nm with respect to the transmission spectra of the entire range of visible light.

BEST MODE FOR CARRYING OUT THE INVENTION

Figure 1:
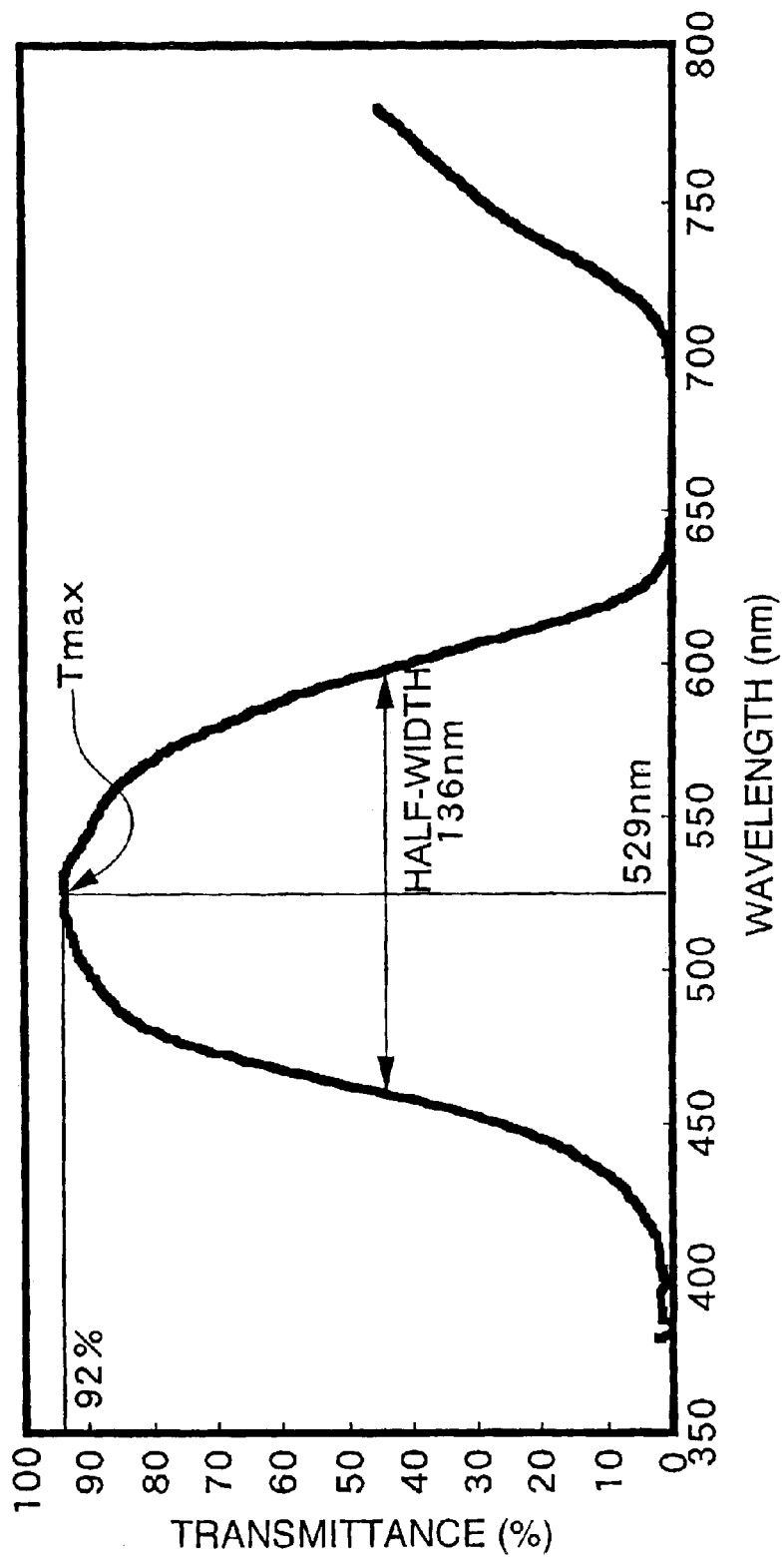
FIG. 1 is a graph showing transmission spectra of green pixel portions of a color filter obtained in Example 1.

The present invention will now be described in detail.

The present invention fulfills the above characteristics (1) and (2). These characteristics will now be explained.

The pigment, which fulfills the above requirement for characteristics (1) and is used in the present invention, refers to a pigment made of a substance containing phthalocyanine molecules (structures) in a chemical structure wherein 8 to 16 halogen atoms are bonded to 4 benzene rings in one phthalocyanine molecule.

Examples of a preferred halogenated metal phthalocyanine pigment used in the present invention include the following two groups of halogenated metal phthalocyanine pigments.

(First Group)

A halogenated metal phthalocyanine pigment having, as a metal center, a metal selected from the group consisting of Al, Si, Sc, Ti, V, Mg, Fe, Co, Ni, Zn, Ga, Ge, Y, Zr, Nb, In, Sn, and Pb in which 8 to 16 halogen atoms are bonded to benzene rings in one phthalocyanine molecule, and in which any one of a halogen atom, hydroxyl group, and sulfonic acid group ($-SO_3H$) is bonded to the metal center when the metal center is a trivalent metal, and one oxygen atom or any two of halogen atoms, hydroxyl groups, and sulfonic acid groups, which may be the same or different, are bonded to the metal center when the metal center is a tetravalent metal.

(Second Group)

A halogenated metal phthalocyanine dimer which has, as a constituent unit, two molecules of a halogenated metal phthalocyanine containing a trivalent metal selected from the group consisting of Al, Sc, Ga, Y, and In as the metal center in which 8 to 16 halogen atoms are bonded to benzene rings in one phthalocyanine molecule, and in which each metal center of the constituent unit is bonded through a divalent atomic group selected from the group consisting of oxygen atom, sulfur atom, sulfinyl group ($-SO-$), and sulfonyl group($-SO_2-$).

In the halogenated metal phthalocyanine pigment used in the present invention, halogen atoms to be bonded to benzene rings may be the same or different. Alternatively, different halogen atoms may be bonded to one benzene ring. In the case in which the number of halogen atoms to be bonded to benzene rings is constant, the order of halogen atoms in accordance with the strength in yellowish tinge is iodine atom>bromine atom>chlorine atom>fluorine atom.

The halogenated metal phthalocyanine pigment wherein 9 to 15 bromine atoms among 8 to 16 halogen atoms are bonded to benzene rings in one phthalocyanine molecule used in the present invention is suitable for use in green pixel portions of the color filter because it exhibits a bright green color having a yellowish tinge.

The halogenated metal phthalocyanine pigment used in the present invention is insoluble or slightly soluble in water and an organic solvent. The halogenated metal phthalocyanine pigment used in the present invention includes both a pigment which is not subjected to a finishing treatment (also referred to as a crude pigment) described hereinafter and a pigment which is subjected to a finishing treatment.

The halogenated metal phthalocyanine pigments, which belong to the above first group and second group, can be represented by the following formula 1:

Formula 1

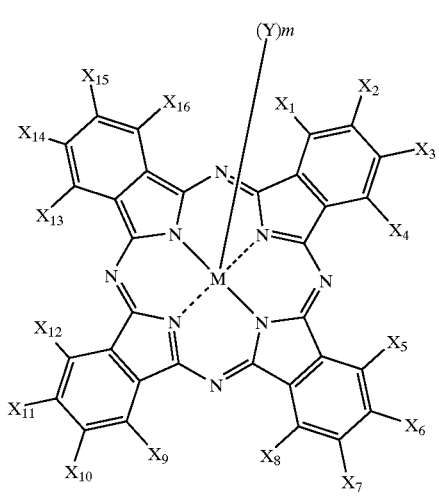

Y =

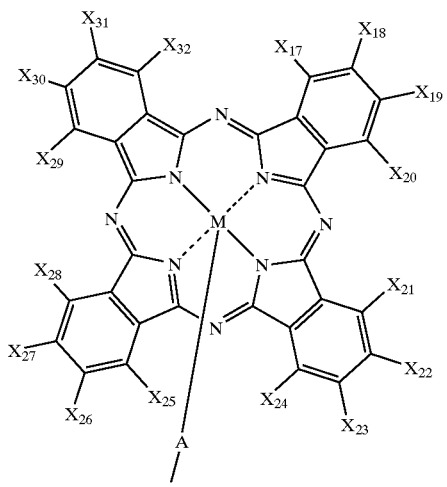

The halogenated metal phthalocyanine pigment which belongs to the first group is represented by the above general formula 1 with the following provisions.

In the general formula 1, $X_1$ to $X_{16}$ represent a hydrogen atom, a chlorine atom, a bromine atom, or an iodine atom. Four X's bonded to one benzene ring may be the same or different. Among $X_1$ to $X_{16}$ bonded to 4 benzene rings, eight to sixteen X's represent a chlorine atom, a bromine atom, or an iodine atom. M represents a metal center. In the scope of the halogenated metal phthalocyanine pigment wherein Y and its number m are the same described hereinafter, the pigment wherein the total number of the chlorine atom, the bromine atom, and the iodine atom is 8 or less exhibits a blue color, and, as the total number increases, the yellowish tinge becomes stronger. Y bonded to the metal center M is a monovalent atomic group selected from the group consisting of halogen atoms of fluorine, chlorine, bromine, and iodine atoms, oxygen atom, hydroxyl group, and sulfonic acid group, while m represents the number of Y bonded to the metal center M and an integer of 0 to 2.

The value of m is decided by the valence of the metal center. In the case in which the metal center M is a trivalent metal like Al, Sc, Ga, Y, and In, m=1, and any one group selected from the group consisting of fluorine, chlorine, bromine, iodine, hydroxyl group, and sulfonic acid group is bonded to the metal center. In the case in which the metal center M is a trivalent metal like Si, Ti, V, Ge, Zr, and Sn, m=2, and any oxygen is bonded to the metal center, or two groups selected from the group consisting of fluorine, chlorine, bromine, iodine, hydroxyl group, and sulfonic acid group are bonded to the metal center. In the case in which metal center M is a divalent metal like Mg, Fe, Co, Ni, Zn, Zr, Sn, and Pb, and Y is absent.

The halogenated metal phthalocyanine pigment belonging to the second group is represented by the above general formula 1.

In the general formula 1, $X_1$ to $X_{16}$ are as defined above, a metal center M represents a trivalent metal selected from the group consisting of Al, Sc, Ga, Y, and In, m represents 1, and Y represents the following atomic group.

In the chemical structure of the atomic group Y, the metal center M is as defined above, and $X_{17}$ to $X_{32}$ are as defined in the general formula 1 with respect to $X_1$ to $X_{16}$. A represents a divalent atomic group selected from the group consisting of oxygen atom, sulfur atom, sulfinyl group (—SO—), and sulfonyl group (—$SO_2$—). M in the general formula 1 is bonded to M of the atomic group Y through a divalent atomic group A.

The halogenated metal phthalocyanine pigment belonging to the second group is a halogenated metal phthalocyanine dimer having two halogenated metal phthalocyanine molecules as a constituent unit wherein these constituent units are bonded through the divalent atomic group.

Specific examples of the halogenated metal phthalocyanine pigment represented by the general formula 1 include the following pigments (i) to (iv):

(i) halogenated metal phthalocyanine pigment such as halogenated tin phthalocyanine pigment, halogenated nickel phthalocyanine pigment, or halogenated zinc phthalocyanine pigment, which has, as a metal center, a divalent metal selected from the group consisting of Mg, Fe, Co, Ni, Zn, Zr, Sn, and Pb, 8 to 16 halogen atoms being bonded to 4 benzene rings in one phthalocyanine molecule;

(ii) halogenated metal phthalocyanine pigment such as halogenated chloroaluminum phthalocyanine, which contains, as a metal center, a trivalent metal selected from the group consisting of Al, Sc, Ga, Y, and In, a metal center having any one of halogen atoms, hydroxyl group, and sulfonic acid group, 8 to 16 halogen atoms being bonded to 4 benzene rings in one phthalocyanine molecule;

(iii) halogenated metal phthalocyanine pigment such as halogenated oxytitanium phthalocyanine or halogenated oxyvanadium phthalocyanine, which contains, as a metal center, a tetravalent metal selected from the group consisting of Si, Ti, V, Ge, Zr, and Sn, metal center having one oxygen atom or any two of halogen atoms, hydroxyl groups, and sulfonic acid groups, which may be the same or different, 8 to 16 halogen atoms being bonded to 4 benzene rings in one phthalocyanine molecule; and (iv) pigment made of a halogenated metal phthalocyanine dimer, such as halogenated µ-oxo-aluminum phthalocyanine dimer or halogenated µ-thio-aluminum phthalocyanine dimer, which contains, as a metal center, a trivalent metal selected from the group consisting of Al, Sc, Ga, Y, and In and also has, as a constituent unit, two halogenated metal phthalocyanine molecules wherein 8 to 16 halogen atoms are bonded to 4 benzene rings in one phthalocyanine molecule, the respective metal centers of these constituent units being bonded through a divalent atomic group selected from the group consisting of oxygen atom, sulfur atom, sulfinyl group, and sulfonyl group.

The method of preparing green pixel portions and a color filter from the halogenated metal phthalocyanine pigment used in the present invention, and a method of measuring transmission spectra of the green pixel portions will be described hereinafter.

Regarding the green pixel portions containing the halogenated metal phthalocyanine pigment used in the present invention, since the wavelength which exhibits maximum transmittance (hereinafter referred to as Tmax) at a wavelength with respect to the transmission spectra of the entire range of visible light (380 to 780 nm) measured by the method described hereinafter is shifted to the long wavelength side and is closer to 545 nm and also the transmittance at Tmax is large, it becomes possible to obtain a color filter comprising green pixel portions which have both a green color having a stronger yellowish tinge and an excellent brightness as compared with a conventional halogenated copper phthalocyanine pigment. To obtain a liquid crystal display device which can display brighter images, the higher the transmittance at Tmax, the better, and the transmittance is preferably 70% or more.

Among the halogenated metal phthalocyanine pigments used in the present invention, a halogenated chloroaluminum phthalocyanine pigment, a halogenated $\mu$-oxo-aluminum phthalocyanine dimer pigment, and a halogenated zinc phthalocyanine pigment are more preferred. The green pixel portions containing these pigments have a Tmax at a wavelength in the range closer to the wavelength of 545 nm of green light of the above three-band lamp, and the transmittance at Tmax is 85% or more. Therefore, when applied to a liquid crystal display device using the three-band lamp, the green pixel portions enable the liquid crystal display device to display bright images even when using a light source having a low intensity.

Figure 3:
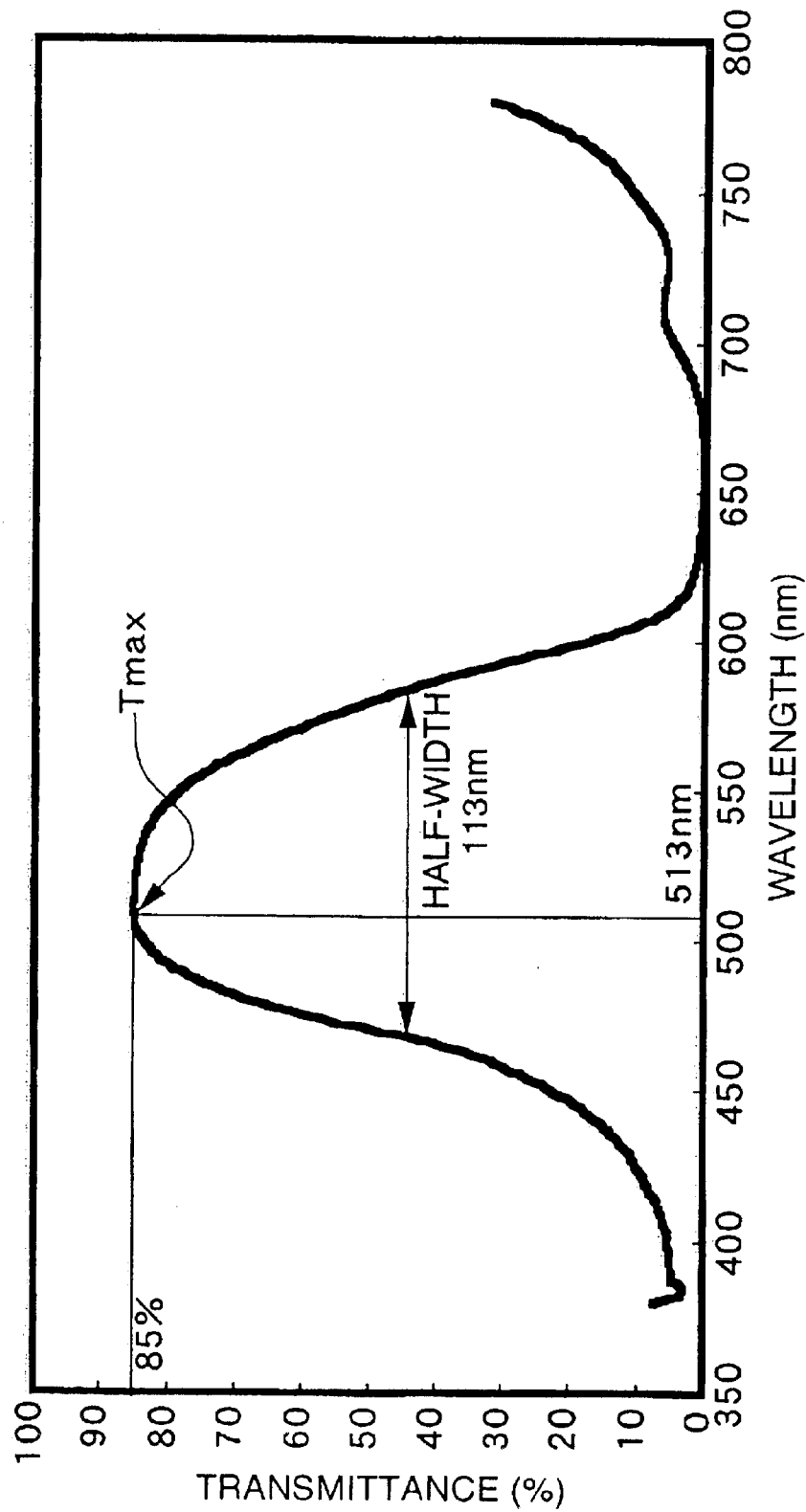
FIG. 3 is a graph showing transmission spectra of green pixel portions of a color filter obtained in Comparative Example 1.

As is apparent from FIG. 1 and FIG. 3, since green pixel portions containing a halogenated chloroaluminum phthalocyanine pigment or a halogenated $\mu$-oxo-aluminum phthalocyanine dimer pigment exhibit a wider range of high transmittance to the transmission spectra of the entire range of visible light as compared with green pixel portions containing a halogenated copper phthalocyanine pigment, the green pixel portions can be preferably used in a color filter of a device set as the object of an increase in luminance because it exhibits a high transmittance even when using a light source which emits a green light having a wavelength other than 545 nm.

Figure 2:
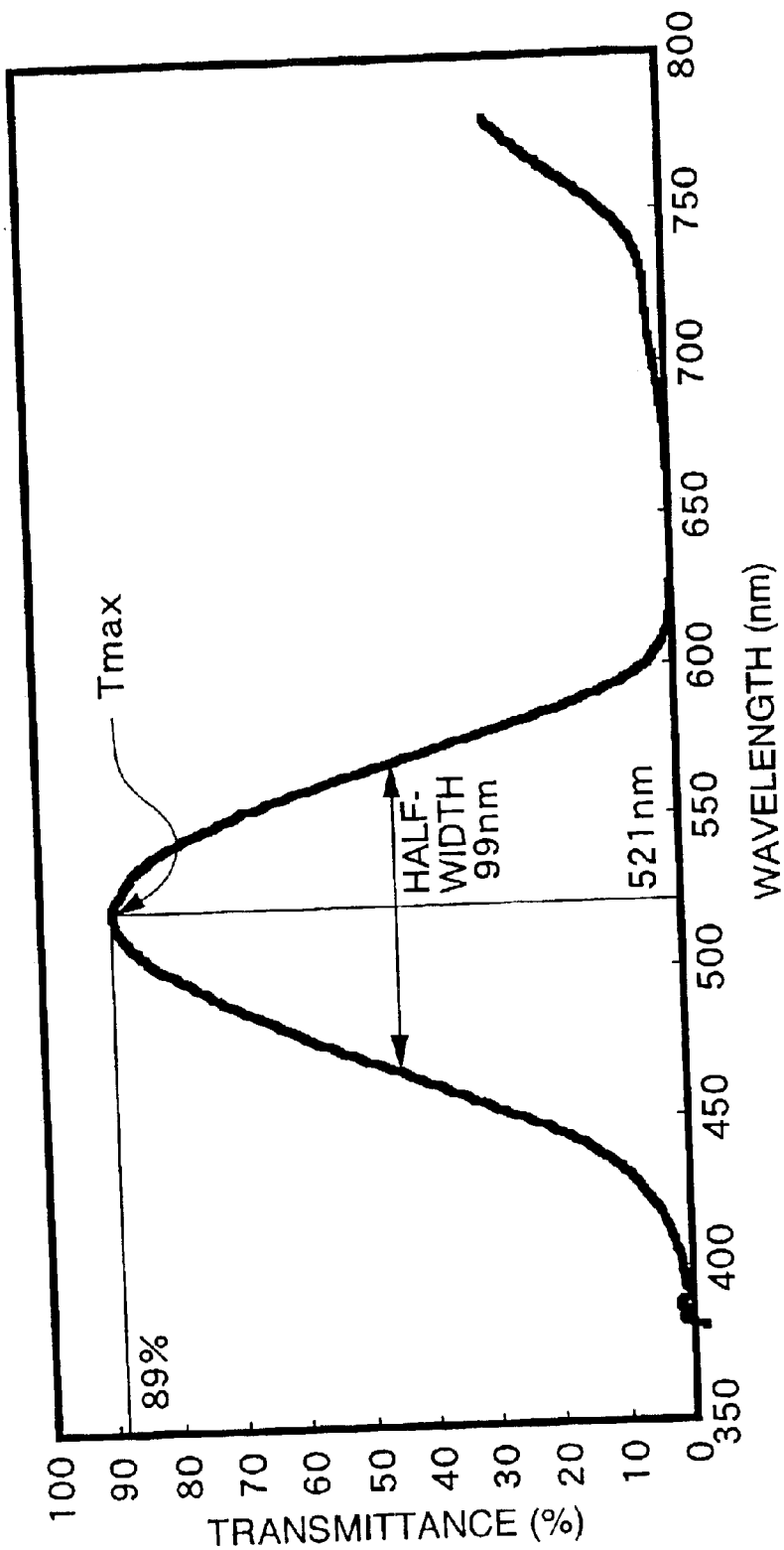
FIG. 2 is a graph showing transmission spectra of green pixel portions of a color filter obtained in Example 3.

Also, as is apparent from FIG. 2 and FIG. 3, since green pixel portions containing a halogenated zinc phthalocyanine pigment exhibit a narrower range of high transmittance to the transmission spectra of the entire range of visible light as compared with green pixel portions containing a halogenated copper phthalocyanine pigment, the green pixel portions can be preferably used in a color filter for a device in which the color filter is desired to exhibit a wide color gamut as shown in a chromaticity diagram.

Regarding the green pixel portions containing a halogenated zinc phthalocyanine pigment, a reduction in average particle diameter of primary particles of the pigment makes it possible to increase the wavelength of Tmax and to increase the transmittance at Tmax. Regarding the green pixel portions containing a halogenated zinc phthalocyanine pigment, even if the average particle diameter of primary particles of the pigment is large, Tmax is shifted to the higher wavelength side as compared with green pixel portions containing a conventional halogenated copper phthalocyanine pigment, and the distance (half-width) between two points on a curve of transmission spectra in the case of interpolation at a value of the transmittance corresponding to a value of half maximum transmittance is very sharp such as 90 to 110 nm. Therefore, high color purity is attained, and even when mixed with a yellow pigment, the amount of transmitted light in the green color range increases, thus obtaining bright images and good image contrast. Accordingly, the green pixel portions can be preferably used in a color filter with high color purity.

In contrast, when the thickness of each color resin film of plural color filters as measuring objects is constant, it can be said that one having a large y value of CIE chromaticity (Y, x, y) has "high color purity". Also, in contrast, when the thickness of each color resin film of plural color filters as measuring objects is decided so that the x value and the y value are made constant, it can be said that one having a small thickness has "high color density", and one having a large y value has "high transparency".

In a comparison between the average particle diameter of the same primary particles, this halogenated zinc phthalocyanine pigment has a characteristic that the tinting power is higher than that of a conventional halogenated copper phthalocyanine pigment by 10% or more. This pigment has an advantage in that the colorant content can be reduced in the case in which green pixel portions of a color filter having the same transmittance at the same color resin film thickness is obtained. In other words, it can be said that the halogenated zinc phthalocyanine pigment used in the present invention is more suitable for reducing the thickness of the film of the green pixel portions of the color filter.

Preferred green pixel portions of the color filter have a wider range wherein transmittance at a wavelength within a range from 650 to 700 nm to the transmission spectra is 5% or less and also has larger maximum transmittance. Low transmittance at a wavelength within this range means a superior color filter which is less likely to be penetrated by red light even in the case of the green pixel portions.

The halogenated metal phthalocyanine pigment used in the present invention is preferably made of only a type of a halogenated metal phthalocyanine pigment, the type of the metal center, the type or the number of the group to be bonded to the metal center, and the type or the number of halogen atoms bonded to 4 benzene rings in one phthalocyanine molecule being constant. The halogenated metal phthalocyanine pigment may be a mixture of two or more kinds of halogenated metal phthalocyanine pigments having different metal centers. It is estimated that the halogenated chloroaluminum phthalocyanine pigment has the same effect as that of the halogenated $\mu$-oxo-aluminum phthalocyanine dimer pigment. Therefore, these pigments can be used in combination.

The halogenated metal phthalocyanine pigment used in the present invention can be prepared by the method described in "The Phthalocyanines, Volume II, Manufacture and Applications" (CRC Press, Inc., 1983), for example, a chlorosulfonic acid method, halogenated phthalonitrile method, melting method, or the like.

The chlorosulfonic acid method includes, for example, a method of dissolving a phthalocyanine pigment having a metal center selected from the group consisting of Al, Si, Sc, Ti, V, Mg, Fe, Co, Ni, Zn, Ga, Ge, Y, Zr, Nb, In, Sn, and Pb in a sulfur oxide solvent such as chlorosulfonic acid, adding a chlorine gas, bromine, and iodine, thereby causing halogenation. The reaction is carried out at a temperature within a range from 20 to 120° C. for 1 to 10 hours.

The halogenated phthalonitrile method includes, for example, a method of synthesizing a corresponding halogenated metal phthalocyanine pigment using, as a starting material, phthalic acid or phthalodinitrile wherein a portion or all of hydrogen atoms of benzene rings are substituted with halogen atoms such as chlorine or iodine, including bromine, and a metal or a metal salt selected from the group consisting of Al, Si, Sc, Ti, V, Mg, Fe, Co, Ni, Zn, Ga, Ge, Y, Zr, Nb, In, Sn, and Pb, as described in "The Phthalocyanines Volume II Manufacture and Applications". If necessary, catalysts such as ammonium molybdate may be used. The reaction is carried out at a temperature within a range from 100 to 300° C. for 1 to 30 hours.

The melting method includes, for example, a method of halogenating using, as halogenating agent, a metalphthalocyanine pigment selected from the group consisting of Al, Si, Sc, Ti, V, Mg, Fe, Co, Ni, Zn, Ga, Ge, Y, Zr, Nb, In, Sn, and Pb in a melt at about 10 to 170° C. composed of a mixture of one or more kinds of compounds, which serve as a solvent during various halogenation reactions, for example, aluminum halide such as aluminum chloride or aluminum bromide, titanium halide such as titanium tetrachloride, alkali metal halide or alkali earth metal halide (hereinafter referred to as an alkali (earth) metal halide) such as sodium chloride or sodium bromide, and thionyl chloride, as described in Japanese Unexamined Patent Application, First Publication No. Sho 51-64534 (U.S. Pat. No. 4,077,974).

The aluminum halide used preferably in the melting method is aluminum chloride. The amount of the aluminum halide added in the above method is usually 3 moles or more, and preferably from 10 to 20 moles, per moles of the metal phthalocyanine pigment.

The dimer pigment as the halogenated metal phthalocyanine pigment used in the present invention can be prepared, for example, by a dehydration reaction or a reaction for removal of hydrogen sulfide of the halogenated metal phthalocyanine pigment having a trivalent metal center, which has a hydroxyl group or thiol group bonded to the metal center, thus obtained described above.

The halogenated metal phthalocyanine pigment used in the present invention is preferably prepared by using, as a raw material, a metal phthalocyanine pigment which exhibits an absorption of light at a wavelength within a range from 650 to 750 nm when converted into a 1-chloronaphthalene solution.

In the halogenated metal phthalocyanine pigment used in the present invention, a halogenated metal phthalocyanine pigment having an average particle diameter of primary particles of 0.01 to 0.10 μm is preferably used in green pixel portions of the color filter of the present invention.

The halogenated metal phthalocyanine pigment having such an average particle diameter is preferred for the following reason. That is, the pigment is less likely to be agglomerated, and the pigment is easily dispersed in a photocurable composition for making the color filter pixel portions which will be described below. Furthermore, the screening ability to light having a wavelength of 365 nm to be used often in the case of curing a photocurable composition for forming pixel portions of the color filter is not reduced (high transparency), and the photocuring sensitivity of the photocurable composition is not reduced, and thus film loss or pattern flow is less likely to occur during the development. Therefore, it becomes possible to easily obtain a color filter comprising pixel portions having both high definition and high brightness, which has recently been required.

The average particle diameter of primary particles in the present invention means a value obtained by taking a microphotograph of particles in the visual field using a transmission electron microscope JEM-2010 (manufactured by JEOL, Ltd.), determining each of longer diameters (major axes) of 50 primary pigment particles constituting an agglomerate on a two-dimensional image and calculating an average thereof. In this case, the microphotograph of the pigment as the sample is taken by a microscope after ultrasonic dispersion in the solvent. Also, a scanning electron microscope may be used in place of the transmission electron microscope.

If necessary, the halogenated metal phthalocyanine pigment used in the present invention can be converted into a halogenated metal phthalocyanine pigment having an average particle diameter of primary particles of 0.01 to 0.10 μm by dry-grinding in a grinder such as an atriter, ball mill, vibration mill, or vibration ball mill and subjecting to a finishing treatment using a solvent salt milling method or a solvent boiling method. The halogenated metal phthalocyanine pigment thus treated is superior in dispersibility and tinting power to the pigment before being subjected to the finishing treatment, and develops a brighter green color having a stronger yellowish tinge.

The method of this finishing treatment is not specifically limited, and any conventionally known method can be employed. The solvent salt milling treatment is preferably employed because the crystal growth can be easily suppressed, and pigment particles having a large specific surface area (more fine particles) can be obtained as compared with the solvent treatment of stirring the halogenated metal phthalocyanine pigment used in the present invention in a large amount of an organic solvent with heating.

This solvent salt milling means an operation of kneading a crude halogenated metal phthalocyanine pigment, which was ground immediately after the synthesis or after the synthesis but not subjected to the finishing treatment, with an inorganic salt and an organic solvent, and grinding the kneaded mixture. Examples of the kneading means include kneader and muller mixer.

Among the halogenated metal phthalocyanine pigments used in the present invention, the pigment having an above average particle diameter obtained by being subjected to the above finishing treatment has a weak cohesive force of primary particles and a degradable property as compared with a conventional halogenated copper phthalocyanine pigment. It is possible to observe primary pigment particles, which cannot be observed in a conventional pigment, using an electron microphotograph.

When a transverse-to-longitudinal aspect ratio of the primary particles of the halogenated metal phthalocyanine pigment used in the present invention is from 1 to 3, the viscosity characteristics in the photocurable composition described hereinafter are improved, and the fluidity of the photocurable composition increases, resulting in good coatability to the transparent substrate for the color filter. To determine the aspect ratio, a microphotograph of particles in the visual field is taken first by a transmission electron microscope or a scanning electron microscope in the same manner as in the case of the average particle diameter of primary particles. Then, an average value of each of longer diameters (major axes) and shorter diameters (minor axes) of 50 primary pigment particles constituting an agglomerate on a two-dimensional image is determined, and the aspect ratio is calculated using these values.

As is apparent from the results of visual evaluation, green pixel portions of the color filter obtained from the halogenated metal phthalocyanine pigment used in the present invention exhibit a green color having a stronger yellowish tinge and excellent brightness as compared with green pixel portions obtained from a conventional halogenated copper phthalocyanine pigment.

When the halogenated metal phthalocyanine pigment used in the present invention has a Tmax shifted to the longer wavelength side and closer to 545 nm and has large maximum transmittance, it becomes possible to obtain a color filter comprising green pixel portions having both a green color having a stronger yellowish tinge and excellent brightness as compared with a conventional halogenated copper phthalocyanine pigment.

That is, according to the halogenated metal phthalocyanine pigment used in the present invention, it becomes possible to obtain a color filter comprising green pixel portions which has a Tmax within a range from 520 to 590 nm, transmittance at Tmax of 70% or more, and transmittance at a wavelength within a range from 650 to 700 nm of 20% or less with respect to the transmission spectra, which could have never been achieved by a conventional halogenated copper phthalocyanine pigment in a simpler manner at a lower price.

Although the color filter of the present invention has the above characteristics, as described above, the Tmax is preferably within a range from 520 to 590 nm, and the transmittance at Tmax is preferably within a range from 85 to 99%, and the transmittance at a wavelength within a range from 650 to 700 nm is preferably within a range from 0 to 20% with respect to the transmission spectra.

Such a preferred color filter can be prepared by using a halogenated chloroaluminum phthalocyanine pigment or halogenated $\mu$-oxo-aluminum phthalocyanine dimer pigment having an average particle diameter of primary particles of 0.01 to 0.10 $\mu$m, a mixture thereof, or a halogenated zinc phthalocyanine pigment among the halogenated metal phthalocyanine pigments used in the present invention.

To obtain the color filter of the present invention, the halogenated metal phthalocyanine pigment used in the present invention is preferably used in combination with various yellow pigments to impart a yellowish tinge so as to form green pixel portions of the color filter. The use of the yellow pigments in combination makes it possible to reduce the transmittance of green pixel portions at a wavelength within a range from 400 to 500 nm with respect to the transmission spectra, for example, to reduce the transmittance at a wavelength within the above range to 50% or less.

Examples of the yellow pigment, which can be used in combination, include organic yellow pigments such as C.I. Pigment YELLOW 83, C.I. Pigment YELLOW 110, C.I. Pigment YELLOW 138, C.I. Pigment YELLOW 139, C.I. Pigment YELLOW 150, C.I. Pigment YELLOW 180, and C.I. Pigment YELLOW 185.

The amount of the yellow pigment used in combination with the halogenated metal phthalocyanine pigment used in the present invention is within a range from 10 to 65 parts by weight based on 100 parts by weight of the halogenated metal phthalocyanine pigment used in the present invention.

The green pixel portions are preferably prepared from the halogenated metal phthalocyanine pigment used in the present invention for the following reason. That is, it is not necessary to use the yellow pigment, which has been an essential component in the prior art, in combination. Alternatively, even if the yellow pigment is used in combination with the halogenated metal phthalocyanine pigment, the amount may be small. In the case of preparing a color filter comprising green pixel portions having the same color as that of green pixel portions of a conventional color filter, the amount of the same yellow pigment to be used in combination with the halogenated metal phthalocyanine pigment can be reduced by about 30% by weight or more, and up to about 50% by weight. In particular, in the case in which green pixel portions of the color filter are obtained from the halogenated metal phthalocyanine pigment wherein 9 or more bromine atoms are bonded to 4 benzene rings in one phthalocyanine molecule, a reduction in transmittance with respect to the transmission spectra of the entire range of visible light can be restrained to the minimum.

According to the halogenated metal phthalocyanine pigment used in the present invention, since a small amount of the yellow pigment may be used even when using in combination, it becomes possible to obtain a color filter having bright pixel portions, which is less turbid because reagglomeration hardly occurs and is also superior in color purity as compared with a case of mixing two or more kinds of pigments having different colors of the prior art. Also, the drawback of portions with neither desired chromaticity nor desired color hue being formed in the pixel portions is unlikely to occur.

As compared with the case of using a mixed pigment using a conventional green pigment such as C.I. Pigment GREEN 36 in combination with the above yellow pigment, a reduction in brightness of the resulting liquid crystal display device is suppressed, and the amount of transmitted light within a green range increases when using the halogenated metal phthalocyanine pigment used in the present invention in combination with the yellow pigment.

These effects are most remarkable when the halogenated metal phthalocyanine pigment used in the present invention is a halogenated metal phthalocyanine pigment having an average particle diameter of primary particles within the above range obtained by being subjected to the above finishing treatment, wherein 9 or more bromine atoms are bonded to 4 benzene rings in one phthalocyanine molecule.

The halogenated metal phthalocyanine pigment used in the present invention can be used to form green pixel portions of the color filter in accordance with a conventionally known method. In the preparation of the color filter of the present invention, the pigment dispersion method can be preferably employed A typical method therefor is photolithography, which is a method of applying a photocurable composition described hereinafter on the surface provided with a black matrix of a transparent substrate for a color filter, drying with heating (prebaking) the coated substrate, irradiating with ultraviolet light via a photo mask, thereby to perform pattern exposure and to cure a photocurable compound at the positions corresponding to the pixel portions, and developing the non-exposed portion with a developing solution, thereby to remove the non-pixel portions and fix the pixel portions onto the transparent substrate.

A color filter comprising red pixel portions, green pixel portions, and blue pixel portions at each predetermined position by preparing the photocurable composition described hereinafter for each of red, green, and blue colors, and repeating the above operation. Green pixel portions are formed from the halogenated metal phthalocyanine pigment used in the present invention. To prepare photocurable compositions for forming red pixel portions and blue pixel portions, conventional red and blue pigments can be used. Examples of the pigment for forming red pixel portions include C.I. Pigment Red 177, C.I. Pigment Red 209, and C.I. Pigment Red 254, while examples of the pigment for forming blue pixel portions include C.I. Pigment Blue 15 and C.I. Pigment Blue 60. To form these red pixel portions and blue pixel portions, yellow pigment and violet pigment can be used in combination. If necessary, the entire color filter can be heat-treated (postbaked) to thermally cure the unreacted photocurable compound.

Examples of the method of applying the photocurable composition described hereinafter on a transparent substrate made of glass include a spin coating method, roll coating method, and ink-jet method.

Although drying conditions of the coating film made of the photocurable composition formed on the transparent substrate vary depending on the type and amount of the respective components, the drying operation is usually conducted at a temperature within a range from 50 to 150° C. for about 1 to 15 minutes. This heat treatment is generally referred to as "prebaking". The light used in photocuring of the photocurable composition is preferably ultraviolet light or visible light having a wavelength within a range from 200 to 500 nm. Various light sources capable of emitting light having a wavelength within the above range can be used.

Examples of the developing method include drawing down method, dipping method, and spraying method. After the completion of the exposure and the development of the photocurable composition, the transparent substrate provided with pixel portions each having a required color is washed with water and then dried. The color filter thus obtained is subjected to a heat treatment (postbaking) using a heating device such as hot plate or oven at 100 to 280° C. for a predetermined time, thereby removing the volatile component in the coating film and thermally curing the unreacted photocurable compound remained in the cured colored film of the photocurable composition, thus completing a color filter.

The photocurable composition (also referred to as a pigment dispersed photoresist) for forming pixel portions of the color filter can be prepared by using the halogenated metal phthalocyanine pigment used in the present invention, a dispersant, a photocurable compound, and an organic solvent as an essential component, and, if necessary, a thermoplastic resin, and mixing them. In the case in which toughness is required for a colored resin film for forming pixel portions, which can endure baking during practical manufacture of the color filter, it is indispensable to use the thermoplastic resin in combination with the photocurable compound in the preparation of the photocurable composition. When used in combination with the thermoplastic resin, an organic solvent capable of dissolving the thermoplastic resin is preferably used.

The photocurable composition is generally prepared by a method of using the halogenated metal phthalocyanine pigment used in the present invention, an organic solvent and a dispersant as an essential component, uniformly mixing and dispersing them with stirring to prepare a pigment dispersion for forming pixel portions of the color filter (also referred to as a colored paste, sometimes) and adding a photocurable compound and, if necessary, a thermoplastic resin or a photopolymerization initiator.

Examples of the dispersant include DISPERBIC 130, DISPERBIC 161, DISPERBIC 162, DISPERBIC 163, and DISPERBIC 170 manufactured by Pikchemy Co., Ltd., and EFKA 46 and EFKA 47 manufactured by EFKA Chemical Co., Ltd. Also, leveling agents, coupling agents, and cationic surfactants can be used in combination.

Examples of the organic solvent include aromatic solvents such as toluene, xylene, and methoxybenzene; acetate solvents such as ethyl acetate, butyl acetate, propylene glycol monomethyl ether acetate, and propylene glycol monoethyl ether acetate; propionate solvents such as ethoxyethyl propionate; alcohol solvents such as methanol and ethanol; ether solvents such as butylcellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; and carbamates such as a mixture of methyl carbamate and ethyl carbamate in a mixing ratio of 48:52. In particular, propionate-, alcohol-, ether-, ketone-, nitrogen compound-, and lactone-based polar solvents, which are soluble in water, are suitable for use as the organic solvent. When using a water-soluble organic solvent, water can be used in combination.

Examples of the thermoplastic resin used in the preparation of the photocurable composition include urethane resin, acrylic resin, polyamide acid resin, polyimide resin, styrene-maleic acid resin, and styrene-maleic anhydride resin. Examples of the photocurable compound include difunctional monomers such as 1,6-hexanediol diacrylate, ethylene glycol diacrylate, neopentyl glycol diacrylate, triethylene glycol diacrylate, bis(acryloxyethoxy) bisphenol A, and 3-methylpentanediol diacrylate; polyfunctional monomers having a relatively low molecular weight, such as trimethyllolpropane triacrylate, pentaerythritol triacrylate, tris(2-hydroxyethyl) isocyanate, dipentaerythritol hexaacrylate, and dipentaerythritol penta acrylate; and polyfunctional monomers having a relatively high molecular weight, such as polyester acrylate, polyurethane acrylate, and polyether acrylate.

Examples of the photopolymerization initiator include acetophenone, benzophenone, benzyl dimethyl ketal, benzoyl peroxide, 2-chlorothioxanthone, 1,3-bis(4'-azidebenzal)-2-propane, 1,3-bis(4'-azidebenzal)-2-propane-2'-sulfonic acid, and 4,4'-diazidestilbene-2,2'-disulfonic acid.

The above pigment dispersion can be obtained by using the above respective materials and uniformly dispersing 100 parts by weight of the halogenated metal phthalocyanine pigment used in the present invention, 300 to 1000 parts by weight of organic solvent, and 0 to 100 parts by weight of a dispersant with stirring. Then, a thermoplastic resin and a photocurable compound in the total amount of 3 to 20 parts by weight based on 1 part by weight of the halogenated metal phthalocyanine pigment used in the present invention, a photopolymerization initiator in the amount of 0.05 to 3 parts by weight based on 1 part by weight of the photocurable compound, and, if necessary, an organic solvent are added to this pigment dispersion, and the mixture is uniformly stirred, thus making it possible to obtain a photocurable composition for forming green pixel portions of the color filter.

As the developing solution, conventionally known organic solvents and aqueous alkali solutions can be used. In the case in which the photocurable composition contains the thermoplastic resin or the photocurable compound and at least one of them has an acid value and exhibits an alkali solubility, washing with the aqueous alkali solution is effective to form pixel portions.

Although the method of preparing the color filter in accordance with photolithography among the pigment dispersion methods was described in detail, the color filter of the present invention may be prepared by forming pixel portions using other methods such as an electrodeposition method, transfer method, micelle electrolytic method, and PVED (Photovoltaic Electrodeposition) method.

The color filter of the present invention is a color filter obtained as described above and exhibits maximum transmittance (Tmax) at a wavelength within a range from 520 to 590 nm with respect to the transmission spectra of the entire range of visible light in green pixel portions.

The method of measuring Tmax of the transmission spectra and the transmittance at Tmax in the present invention is as follows. As a backlighting light source of a conventional liquid crystal display device, a three-band lamp capable of emitting a green light having a main emission line at about 545 nm is used. Using a three-band fluorescent lamp F10 light source having a main emission line at about 545 nm, which is a type of this three-band lamp, specified in Japanese Industrial Standard (JIS) Z8719, the evaluation was carried out.

The transmission spectra in the present invention is determined in accordance with the first-class spectrophotometer specified in Japanese Industrial Standard (JIS) Z 8722 (Colorimetry of Reflected or Transmitted Object). That is, a resin film containing a pigment formed on a transparent substrate such as a glass substrate in a predetermined thickness was irradiated with light having a wavelength within a predetermined range, and each transmittance at each wavelength was plotted. In the present invention, visible light has a wavelength within this predetermined range. In the formation of the resin film containing the pigment, a photocurable compound, and a thermoplastic resin can be used. In the measurement of the transmittance, a dry color resin film or a cured color resin film is formed. A photocurable composition for forming pixel portions of the color filter described above can be used in a simple manner. Since the components other than the pigment contained in the photocurable composition exhibit no or very small light absorption at a wavelength within a range from 520 to 590 nm when formed into a color resin film, these components exert a small influence on the absolute value of the measured transmittance.

Thus, Tmax and transmittance at Tmax can be determined from the transmission spectra. The transmittance of the color filter can be obtained with good accuracy by collection (base line collection) with the transmission spectra determined with respect to the film made of the resin having the same thickness.

EXAMPLES

The present invention will be illustrated in detail by way of examples. In the following examples, percentages and parts are by weight unless otherwise specified.

Preparation Example 1

Using phthalic anhydride, urea, and aluminum chloride as raw materials, chloroaluminum phthalocyanine was prepared. A 1-chloronaphthalene solution of the chloroaluminum phthalocyanine exhibited an absorption of light at a wavelength within a range from 650 to 750 nm.

As a halogenating agent, a mixture was prepared by mixing 3.2 parts of thionyl chloride, 3.8 parts of anhydrous aluminum chloride, and 0.5 parts of sodium chloride at 40° C. and adding dropwise 2.7 parts of bromine. To the mixture, 1 part of chloroaluminum phthalocyanine was added, and the reaction was conducted at 90° C. for 15 hours. After the completion of the reaction, the reaction mixture was poured into water to deposit a crude halogenated chloroaluminum phthalocyanine pigment. The aqueous slurry was collected by filtration, washed, in order, with hot water at 60° C., 1% sodium hydrogensulfate water, and hot water at 60° C., and then dried at 90° C. to obtain 2.7 parts of a purified crude halogenated chloroaluminum phthalocyanine pigment.

1 part of this crude halogenated chloroaluminum phthalocyanine pigment, 7 parts of ground sodium chloride, 1 part of diethylene glycol, and 0.09 parts of xylene were charged in a twin-arm type kneader, and then kneaded at 100° C. for 6 hours. After kneading, the kneaded mixture was taken in 100 parts of water at 80° C. and stirred for one hour, followed by collection with filtration, washing with hot water, drying, and further grinding to obtain a halogenated aluminum phthalocyanine pigment (i).

The halogen content analysis by flask combustion ion chromatogram showed that this halogenated aluminum phthalocyanine pigment (i) has an average composition of $AlClPcBr_{14}Cl_1H$ (Pc represents a chemical structure wherein M and Y are excluded from the general formula 1. The same may be said of the following. It was estimated that this average composition contains a halogenated chloroaluminum phthalocyanine pigment of the general formula 1 wherein M=Al, Y=Cl, m=1, fourteen X's among $X_1$ to $X_{16}$ are bromine atoms, one X is a chlorine atom, and one X is a hydrogen atom, and a halogenated $\mu$-oxo-aluminum phthalocyanine dimer pigment of the general formula 1 wherein M=Al,. m=1, metal center M of Y=Al, fourteen X's among $X_{17}$ to $X_{32}$ are bromine atoms, one X is a chlorine atom, and one X is a hydrogen atom, and A is an oxygen atom).

Preparation Example 2

Using phthalic anhydride, urea, and vanadium pentoxide as raw materials, oxyvanadium phthalocyanine was prepared. A 1-chloronaphthalene solution of the oxyvanadium phthalocyanine exhibited an absorption of light at a wavelength within a range from 650 to 750 nm.

As a halogenating agent, a mixture was prepared by mixing 3.1 parts of thionyl chloride, 3.7 parts of anhydrous aluminum chloride, and 0.5 parts of sodium chloride at 40° C. and adding dropwise 2.6 parts of bromine. To the mixture, 1 part of oxyvanadium phthalocyanine was added, and the reaction was conducted at 90° C. for 15 hours. After the completion of the reaction, the reaction mixture was poured into water to deposit a crude halogenated oxyvanadium phthalocyanine pigment. The aqueous slurry was collected by filtration, washed, in order, with hot water at 60° C., 1% sodium hydrogensulfate water, acetone containing 7% toluene, and hot water at 60° C., and then dried at 90° C. to obtain 2.6 parts of a purified crude halogenated vanadyl phthalocyanine pigment.

1 part of this crude halogenated oxyvanadium phthalocyanine pigment, 7 parts of ground sodium chloride, and 1 part of diethylene glycol were charged in a twin-arm type kneader, and then kneaded at 80° C. for 8 hours. After kneading, the kneaded mixture was taken in 100 parts of water at 80° C. and stirred for one hour, followed by collection with filtration, washing with hot water, drying, and further grinding to obtain a halogenated oxyvanadium phthalocyanine pigment (ii).

The halogen content analysis by flask combustion ion chromatogram showed that this halogenated oxyvanadium phthalocyanine pigment (ii) has an average composition of $VOPcBr_{13}Cl_2H$ (in the general formula 1, M=V, Y=O, m=1, thirteen X's among $X_1$ to $X_{16}$ are bromine atoms, two X's are chlorine atoms, and one X is a hydrogen atom).

Preparation Example 3

Using phthalodinitrile and zinc chloride as raw materials, zinc phthalocyanine was prepared. A 1-chloronaphthalene solution of the zinc phthalocyanine exhibited an absorption of light at a wavelength within a range from 650 to 750 nm.

As a halogenating agent, a mixture was prepared by mixing 3.1 parts of thionyl chloride, 3.7 parts of anhydrous aluminum chloride, and 0.5 parts of sodium chloride at 40° C. and adding dropwise 2.6 parts of bromine. To the mixture, 1 part of zinc phthalocyanine was added, and the reaction was conducted at 90° C. for 15 hours. After the completion of the reaction, the reaction mixture was poured into water to deposit a crude halogenated zinc phthalocyanine pigment. The aqueous slurry was collected by filtration, washed, in order, with hot water at 60° C., 1% sodium hydrogensulfate water, acetone containing 7% toluene, and hot water at 60° C., and then dried at 90° C. to obtain 2.6 parts of a purified crude halogenated zinc phthalocyanine pigment.

1 part of this crude halogenated zinc phthalocyanine pigment, 7 parts of ground sodium chloride, 1 part of diethylene glycol, and 0.09 parts of xylene were charged in a twin-arm type kneader, and then kneaded at 100° C. for 6 hours. After kneading, the kneaded mixture was taken in 100 parts of water at 80° C. and stirred for one hour, followed by collection with filtration, washing with hot water, drying, and further grinding to obtain a halogenated zinc phthalocyanine pigment (iii).

The halogen content analysis by flask combustion ion chromatogram showed that this halogenated oxyvanadium phthalocyanine pigment (iii) has an average composition of $ZnPcBr_{14}Cl_1H$ (in the general formula 1, M=Zn, m=0, fourteen X's among $X_1$ to $X_{16}$ are bromine atoms, one X is a chlorine atom, and one X is a hydrogen atom).

Preparation Example 4

Using phthalodinitrile and titanium tetrachloride as raw materials, oxytitanium phthalocyanine was prepared. A 1-chloronaphthalene solution of the oxytitanium phthalocyanine exhibited an absorption of light at a wavelength within a range from 650 to 750 nm.

As a halogenating agent, a mixture was prepared by mixing 3.1 parts of thionyl chloride, 3.7 parts of anhydrous aluminum chloride, and 0.5 parts of sodium chloride at 40° C. and adding dropwise 2.6 parts of bromine. To the mixture, 1 part of oxytitanium phthalocyanine was added, and the reaction was conducted at 90° C. for 15 hours. After the completion of the reaction, the reaction mixture was poured into water to deposit a crude halogenated oxytitanium phthalocyanine pigment. The aqueous slurry was collected by filtration, washed, in order, with hot water at 60° C., 1% sodium hydrogensulfate water, acetone containing 7% toluene, and hot water at 60° C., and then dried at 90° C. to obtain 2.6 parts of a purified crude halogenated oxytitanium phthalocyanine pigment.

1 part of this crude halogenated oxytitanium phthalocyanine pigment, 7 parts of ground sodium chloride, 1 part of diethylene glycol, and 0.09 parts of xylene were charged in a twin-arm type kneader, and then kneaded at 100° C. for 6 hours. After kneading, the kneaded mixture was taken in 100 parts of water at 80° C. and stirred for one hour, followed by collection with filtration, washing with hot water, drying, and further grinding to obtain a halogenated titanyl phthalocyanine pigment (iv).

The halogen content analysis by flask combustion ion chromatogram showed that this halogenated oxytitanium phthalocyanine pigment (iv) has an average composition of $TiOPcBr_{10}Cl_5H$ (in the general formula 1, M=Ti, Y=O, m=1, ten X's among $X_1$ to $X_{16}$ are bromine atoms, five X's are chlorine atoms, and one X is a hydrogen atom).

Preparation Example 5

Using phthalodinitrile and nickel chloride as raw materials, nickel phthalocyanine was prepared. A 1-chloronaphthalene solution of the nickel phthalocyanine exhibited an absorption of light at a wavelength within a range from 650 to 750 nm.

As a halogenating agent, a mixture was prepared by mixing 3.1 parts of thionyl chloride, 3.7 parts of anhydrous aluminum chloride, and 0.5 parts of sodium chloride at 40° C. and adding dropwise 2.6 parts of bromine. To the mixture, 1 part of nickel phthalocyanine was added, and the reaction was conducted at 90° C. for 15 hours. After the completion of the reaction, the reaction mixture was poured into water to deposit a crude halogenated nickel phthalocyanine pigment. The aqueous slurry was collected by filtration, washed, in order, with hot water at 60° C., 1% sodium hydrogensulfate water, acetone containing 7% toluene, and hot water at 60° C., and then dried at 90° C. to obtain 2.6 parts of a purified crude halogenated nickel phthalocyanine pigment.

1 part of this crude halogenated nickel phthalocyanine pigment, 7 parts of ground sodium chloride, 1 part of diethylene glycol, and 0.09 parts of xylene were charged in a twin-arm type kneader, and then kneaded at 100° C. for 6 hours. After kneading, the kneaded mixture was taken in 100 parts of water at 80° C. and stirred for one hour, followed by collection with filtration, washing with hot water, drying, and further grinding to obtain a halogenated nickel phthalocyanine pigment (v).

The halogen content analysis by flask combustion ion chromatogram showed that this halogenated oxytitanium phthalocyanine pigment (v) has an average composition of $NiPcBr_{13}Cl_2H_1$ (in the general formula 1, M=Ni, m=0, thirteen X's among $X_1$ to $X_{16}$ are bromine atoms, two X's are chlorine atoms, and one X is a hydrogen atom).

Preparation Example 6

Using phthalodinitrile and tin chloride as raw materials, tin phthalocyanine was prepared. A 1-chloronaphthalene solution of the tin phthalocyanine exhibited an absorption of light at a wavelength within a range from 650 to 750 nm.

As a halogenating agent, a mixture was prepared by mixing 3.1 parts of thionyl chloride, 3.7 parts of anhydrous aluminum chloride, and 0.5 parts of sodium chloride at 40° C. and adding dropwise 2.6 parts of bromine. To the mixture, 1 part of tin phthalocyanine was added, and the reaction was conducted at 90° C. for 15 hours. After the completion of the reaction, the reaction mixture was poured into water to deposit a crude halogenated tin phthalocyanine pigment. The aqueous slurry was collected by filtration, washed, in order, with hot water at 60° C., 1% sodium hydrogensulfate water, acetone containing 7% toluene, and hot water at 60° C., and then dried at 90° C. to obtain 2.6 parts of a purified crude halogenated tin phthalocyanine pigment.

1 part of this crude halogenated tin phthalocyanine pigment, 7 parts of ground sodium chloride, 1 part of diethylene glycol, and 0.09 parts of xylene were charged in a twin-arm type kneader, and then kneaded at 100° C. for 6 hours. After kneading, the kneaded mixture was taken in 100 parts of water at 80° C. and stirred for one hour, followed by collection with filtration, washing with hot water, drying, and further grinding to obtain a halogenated tin phthalocyanine pigment (vi).

The halogen content analysis by flask combustion ion chromatogram showed that this halogenated tin phthalocyanine pigment (vi) has an average composition of SnPcBr$_{10}$Cl$_5$H (in the general formula 1, M=Sn, m=0, ten X's among X$_1$ to X$_{16}$ are bromine atoms, five X's are chlorine atoms, and one X is a hydrogen atom).

Preparation Example 7

In the same manner as in Preparation Example 3, except that the conditions were changed so that primary particles has an average particle diameter of 0.03 μm in Preparation Example 3, a halogenated zinc phthalocyanine pigment (vii) was obtained.

Comparative Preparation Example 1

Using phthalic anhydride, urea, and cuprous chloride as raw materials, copper phthalocyanine was prepared. A 1-chloronaphthalene solution of the copper phthalocyanine exhibited no absorption of light at a wavelength within a range from 650 to 750 nm.

Using this copper phthalocyanine and the same halogenating agent as in Preparation Example 1, bromination was conducted by the same operation as in Preparation Example 1 to obtain a brominated copper phthalocyanine pigment (viii) (which corresponds to the pigment of the general formula 1 wherein M=Cu, m=0, fifteen X's among X$_1$ to X$_{16}$ are bromine atoms, and one X is a hydrogen atom, supposing it is explained using the general formula 1).

Example 1 to 6

Using pigments (i), (ii), (iii), (iv), (v), and (vi) obtained in the above Preparation Examples as a green pigment, green pixel portions (i), (ii), (iii), (iv), (v), and (vi) of a color filter were prepared by photolithography.

The green pixel portions of the color filter were prepared in the following manner. After adding 0.5 mm diameter Sepr beads, 14 parts of each of the pigments, 3 parts of C.I. Pigment Yellow 150 (organic yellow pigment for color toning), 2.5 parts of N,N'-dimethylformamide (organic solvent), 17.0 parts of DISPERBIC 161 (dispersant manufactured by Pikchemy Co., Ltd.), and 63.5 parts of Unicar Ester EEP (organic solvent manufactured by Union Carbide) were dispersed in a paint conditioner (manufactured by Toyo Seiki Co., Ltd.) for one hour to obtain a pigment dispersion (colored paste). 75.00 Parts of this pigment dispersion, 5.50 parts of ARONIX M7100 (polyester acrylate manufactured by TOAGOSEI CO., LTD., which corresponds to a photocurable compound), 5.00 parts of KAYARAD DPHA (dipentaerythrate hexaacrylate manufactured by NIPPON KAYAKU CO., LTD., which corresponds to a photocurable compound), 1.00 parts of KAYACURE BP-100 (benzophenone manufactured by NIPPON KAYAKU CO., LTD., which corresponds to a photopolymerization initiator), and 13.5 parts of Unicar Ester EEP were stirred using a dispersion stirrer to obtain a photocurable composition for forming green pixel portions of a color filter. This composition was applied on a 1 mm thick glass so that the resulting dry film had a thickness of 1 μm.

Then, pattern exposure to ultraviolet light was performed via a photo mask, and the non-exposed portion was washed with an organic solvent to obtain green pixel portions for a color filter.

The average particle diameter of primary particles in the respective pigments was determined from the results obtained by measuring using a transmission electron microscope JEM-2010 (manufactured by JEOL, Ltd.).

The hue and brightness of green pixel portions for a color filter (i), (ii), (iii), (iv), (v), and (vi) prepared from these pigments (i) to (vi) were visually evaluated. Using a first-class spectrophotometer specified in Japanese Industrial Standard (JIS) Z 8722, the transmission spectra in the entire range of visible light was measured, and then the wavelength at which the maximum transmittance is exhibited (Tmax), the transmittance at Tmax, and the maximum transmittance at a wavelength within a range from 650 to 700 nm were measured. With respect to green pixel portions for a color filter (i) and (iii), the distance (half-width) between two points of section formed by a curve of transmission spectra and an interpolation line of a value of the transmittance corresponding to 50% of a value of maximum transmittance (the distance represented by the symbol ⇆ in the drawing was expressed by the unit (nm)) was measured. The results are shown in Table 1. The transmission spectra of the respective green pixel portions for a color filter obtained in Example 1 and Example 3 are shown in FIG. 1 and FIG. 2.

In the same manner as in the case of green pixel portions, except for using C.I. Pigment Red 254 (diketopyrrolopyrrole red organic pigment) and C.I. Pigment Blue 15:6 (ε type copper phthalocyanine blue organic pigment) each having the same average particle diameter of primary particles as that of the pigment (i) in place of pigment (i), red and blue photocurable compositions were prepared to form red pixel portions and blue pixel portions, respectively, thus obtaining a color filter with red pixel portions, green pixel portions, and blue pixel portions.

Comparative Example 1

In the same manner as in Example 1, except for using the brominated copper phthalocyanine pigment (viii) in place of the aluminum halidephthalocyanine pigment (i) in Example 1, green pixel portions for a color filter (viii) were prepared.

In the same manner as in Example 1, the average particle diameter of primary particles of the pigment (viii) was measured, and the hue and brightness of green pixel portions for a color filter (viii) prepared from the pigment (viii) were visually prepared. Using a spectrophotometer, Tmax, the transmittance at Tmax, and the maximum transmittance at a wavelength within a range from 650 to 700 nm were measured. Furthermore, the distance (half-width) between two points of section formed by a curve of transmission spectra, and an interpolation line of a value of the transmittance corresponding to 50% of a value of maximum transmittance was measured. The results are shown in Table 1. The transmission spectra of green pixel portions for a color filter are shown in FIG. 3, in which the abscissa shows the transmittance, and the ordinate shows the wavelength.

TABLE 1

|  |  | Example 1 | Example 2 | Example 3 | Example 4 | Example 5 | Example 6 | Comparative Example 1 |
|---|---|---|---|---|---|---|---|---|
| Green pixel portions for color filter | | (i) | (ii) | (iii) | (iv) | (v) | (vi) | (viii) |
| Pigment composition | | AlClPcBr$_{14}$Cl$_1$H | V(O)PcBr$_{13}$Cl$_2$H | ZnPcBr$_{14}$Cl$_1$H | Ti(O)PcBr$_{10}$Cl$_5$H | NiPcBr$_{13}$Cl$_2$H | SnPcBr$_{10}$Cl$_5$H | CuPcBr$_{15}$H |
| Average particle diameter of primary particles | | 0.03 μm | 0.03 μm | 0.06 μm | 0.01 μm | 0.01 μm | 0.01 μm | 0.04 μm |
| Visual evaluation | Hue | ○ | ○ | ○ | ○ | ○ | ○ | X |
| | Brightness | ○ | Δ | Δ | Δ | Δ | Δ | Δ |
| Measured value | Tmax | 529 nm | 535 nm | 521 nm | 528 nm | 526 nm | 530 nm | 513 nm |
| | Transmittance at Tmax | 92% | 78% | 89% | 83% | 75% | 80% | 85% |
| | Half-width | 136 nm | — | 99 nm | — | — | — | 113 nm |
| | Maximum transmittance at a wavelength within a range from 650 to 700 nm | 0.3% | 4.4% | 1.8% | 6.9% | 1.0% | 1.6% | 5.0% |

In Table 1, the respective symbols denote the following.

Hue
○: green color having a considerably strong yellowish tinge
X: green color having a yellowish tinge Brightness
○: very bright
Δ: slightly dark As is apparent from Table 1, green pixel portions for a color filter (i), (ii), (iii), (iv), (v), and (vi), which use halogenated metal phthalocyanine pigments (i), (ii), (iii), (iv), (v), and (vi) using Al, V, Zn, Ti, Ni, and Sn as the metal center, had a stronger yellowish tinge, as a result of visual evaluation.

On the other hand, the green pixel portions for a color filter (viii) prepared from the halogenated copper phthalocyanine pigment (viii) using copper as the metal center showed a green color having an insufficient yellowish tinge and poor brightness.

Example 7

In the same manner as in Example 3, except for using the halogenated zinc phthalocyanine pigment (vii) in place of the halogenated zinc phthalocyanine pigment (iii) in Example 3, green pixel portions for a color filter (vii) were formed, and the measurement was conducted in the same manner as described above. The results of Example 7 are shown in Table 2.

TABLE 2

|  |  | Example 7 |
|---|---|---|
| | Color filter | (vii) |
| | Composition | ZnPcBr$_{14}$Cl$_1$H |
| | Average particle diameter of primary particles | 0.03 μm |
| Visual evaluation | Hue | ○ |
| | Brightness | ○ |
| Measured value | Tmax | 529 nm |
| | Transmittance at Tmax | 92% |
| | Half-width | 105 nm |
| | Maximum transmittance at 650 to 700 nm | 7.3% |

As is apparent from a comparison between Example 3 and Example 7, green pixel portions obtained from the halogenated zinc phthalocyanine pigment (vii) having a reduced average particle diameter of primary particles is superior in brightness in visual evaluation to the halogenated zinc phthalocyanine pigment (iii) and also show Tmax closer to 545 nm and higher transmittance at Tmax.

With respect to samples made from the pigments (vii) and (viii) in accordance with JIS K5101-1991 (Japanese Industrial Standard, "Pigment Test Procedure"), each L value was determined by a spectrophotometer manufactured by Datacolor, and the resulting value was taken as a measure of the tinting power. Assuming that the L value of the halogenated copper phthalocyanine pigment (viii) of Comparative Example 1 corresponds to 100, the L value of the halogenated zinc phthalocyanine pigment (vii) corresponds to 99, and the tinting power was higher by 10%.

In any of the green pixel portions obtained in the respective Examples, the portions with neither desired chromaticity nor desired color hue were not visually observed in the pixel portions.

Industrial Applicability

Since the color filter of the present invention comprises green pixel portions which contain a halogenated metal phthalocyanine dye wherein 8 to 16 halogen atoms are bonded to benzene rings in one phthalocyanine molecule, and exhibit maximum transmittance at a wavelength within a range from 520 nm to 590 nm with respect to the transmission spectra of the entire range of visible light, it exerts a noticeable effect of developing a brighter green color having a strong yellowish tinge as compared with a color filter comprising green pixel portions using a conventional halogenated copper phthalocyanine.

Also, it exerts a noticeable effect in being less likely to cause such a problem that portions with desired chromaticity and desired color hue and portion with neither desired chromaticity nor desired color hue are present simultaneously in pixel portions of the same color.

What is claimed is:

1. A color filter comprising a transparent substrate and red pixel portions, green pixel portions, and blue pixel portions formed on said transparent substrate, wherein said green pixel portions (1) contain a halogenated metal phthalocyanine pigment represented by the following formula 1:

Formula 1

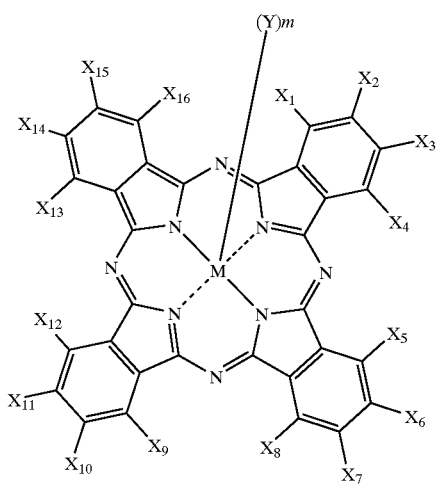

wherein $X_1$ to $X_{16}$ represent a hydrogen atom, a chlorine atom, a bromine atom, or an iodine atom; four X's bonded to one benzene ring may be the same or different; among $X_1$ to $X_{16}$ bonded to 4 benzene rings, eight to sixteen X's represent a chlorine atom, a bromine atom, or an iodine atom; M represents a metal center and is a metal selected from the group consisting of Si, Sc, Ti, Mg, Fe, Co, Ni, Zn, Ge, Y, Zr, Nb, Sn, and Pb; Y bonded to the metal center M is a monovalent atomic group selected from the group consisting of halogen atoms of fluorine, chlorine, bromine, and iodine atoms, oxygen atom, hydroxyl group (—OH), and sulfonic acid group (—$SO_3H$); m represents the number of Y bonded to the metal center M and is an integer of 0 to 2; any one of a halogen atom, hydroxyl group, and sulfonic acid group is bonded to the metal center when the metal center is a trivalent metal, and one oxygen atom or any two of halogen atoms, hydroxyl groups, and sulfonic acid groups, which may be the same or different, are bonded to the metal center when the metal center is a tetravalent metal; and (2) exhibit maximum transmittance at a wavelength within a range from 520 nm to 590 nm with respect to the transmission spectra of the entire range of visible light.

2. The color filter according to claim 1, wherein the metal center M is Zn and m is 0.

3. A color filter comprising a transparent substrate and red pixel portions, green pixel portions, and blue pixel portions formed on said transparent substrate, wherein said green pixel portions (1) contain a halogenated metal phthalocyanine pigment represented by the following formula 1:

Formula 1

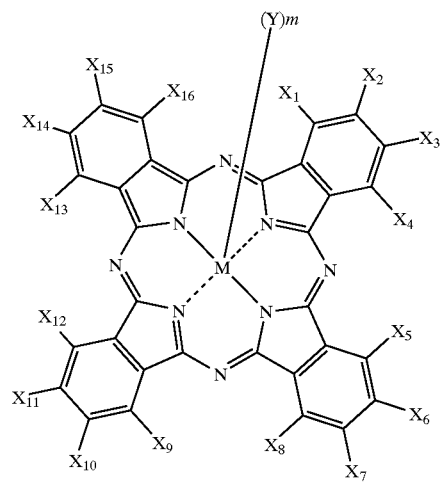

wherein $X_1$ to $X_{16}$ represent a hydrogen atom, a chlorine atom, a bromine atom, or an iodine atom; four X's bonded to one benzene ring may be the same or different; among $X_1$ to $X_{16}$ bonded to 4 benzene rings, eight to sixteen X's represent a chlorine atom, a bromine atom, or an iodine atom; M represents a metal center and is a trivalent metal selected from the group consisting of Sc and Y; m represents 1; Y represents the following atomic group:

Y =
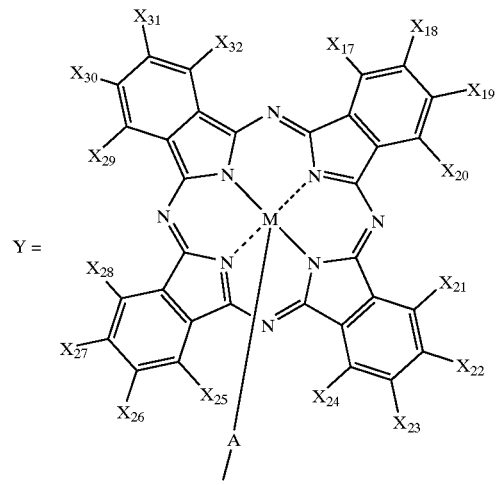

wherein $X_{17}$ to $X_{32}$ represent a hydrogen atom, a chlorine atom, a bromine atom, or an iodine atom; four X's bonded to one benzene ring may be the same or different; among $X_{17}$ to $X_{32}$ bonded to 4 benzene rings, eight to sixteen X's represent a chlorine atom, a bromine atom, or an iodine atom; M represents a metal center and is a trivalent metal selected from the group consisting of Sc and Y; and A represents a divalent atomic group selected from the group consisting of oxygen atom, sulfur atom, sulfinyl group (—SO—), and sulfonyl group (—$SO_2$—); M in the general formula 1 is bonded to M of the atomic group Y through a divalent atomic group A and (2) exhibit maximum transmittance at a wavelength within a range from 520 nm to 590 nm with respect to the transmission spectra of the entire range of visible light.

4. The color filter according to any one of claims 1 to 3, wherein the halogenated metal phthalocyanine pigment has an average particle diameter of primary particles of 0.01 to 0.10 μm.

5. The color filter according to any one of claims 1 to 3, wherein 9 or more halogen atoms among 8 to 16 halogen atoms bonded to the benzene rings in one phthalocyanine molecule are bromine atoms.

6. The color filter according to any one of claims 1 to 3, wherein transmittance of said green pixel portions at the wavelength of maximum transmittance is 70% or more.

7. The color filter according to any one of claims 1 to 3, wherein transmittance of said green pixel portions at the wavelength of maximum transmittance is 85% or more.

8. The color filter according to any one of claims 1 to 3, wherein the green pixel portions have transmittance at the wavelength of maximum transmittance of 70% or more, and transmittance at a wavelength within a range from 650 to 700 nm of 20% or less.

9. The color filter according to claim 8, wherein the transmittance at a wavelength within a range from 650 to 700 nm is 7.3% or less.

\* \* \* \* \*